United States Patent Office 3,419,645
Patented Dec. 31, 1968

3,419,645
PROCESS FOR PREPARING FINELY POROUS, SHAPED CARBON BODIES
Gerhard Pietzka, Lorsbach, Taunus, and Alfred Pelz, Frankfurt am Main, Germany, assignors to Farbwerke Hoechst Aktiengesellschaft vormals Meister Lucius & Bruning, Frankfurt am Main, Germany, a corporation of Germany
No Drawing. Filed Sept. 28, 1965, Ser. No. 491,047
Claims priority, application Germany, Oct. 3, 1964, F 44,128
8 Claims. (Cl. 264—29)

ABSTRACT OF THE DISCLOSURE

A process has been provided for preparing finely porous, shaped carbon bodies wherein coke and hard pitch are separately ground to a particle size of at most 1 mm., said pitch having a softening point of at least 100° C. The ground coke and pitch are mixed in a ratio of from 4:1 to 1:4 and the mixture is further ground until it passes substantially through a mesh screen having a mesh width of at most 150μ. The ground mixture is then mixed with a dispersion of colloidal graphite and the mixture of coke, pitch, and dispersed graphite is shaped at a pressure of from 20 to 300 kg./cm. such that no liquid is squeezed out from the pressed body. The pressed body is then dried and baked.

---

It is known to introduce additional pores into carbon bodies by incorporating easily soluble or easily volatile compounds into the green mixture used for the preparation of such shaped carbon bodies and dissolving these compounds after baking or evaporating these during baking. Some organic compounds which yield only small coke residues on baking also leave behind additional pores in carbon bodies. Furthermore, it is known to prepare mixtures of finely pulverized carbon, for example, graphite or lamp black, with solutions or dispersions of cokable binders such as sugar or soluble synthetic resins and to bake them to produce porous bodies. Finally, it is known to prepare porous bodies with mixtures having uniformly sized particles (mixtures which consist of particles that have approximately the same size).

Now, we have found a process for preparing finely porous, shaped carbon bodies, which comprises preparing a mixture from finely ground coke, finely ground hard pitch and a dispersion of colloidal graphite in water, if desired or required, with the addition of lower aliphatic alcohols such as methanol or ethanol or of acetone, shaping the mixture by means of a press, preferably a block press, drying the body pressed and subsequently either baking it to form a porous shaped carbon body and, if desired or required, impregnating it, or densifying it by pressing at an elevated temperature which, however, is below the softening point of the hard pitch and then baking it to form a dense carbon body.

For carrying out the process of the present invention, carbon in the form of fine-grained coke and hard pitch are ground, at first separately, until they have a particle size of at most 1 mm. Any of the various types of choke may be used, for example, petroleum coke, coal tar pitch coke, calcined anthracite, cork coke, wood charcoal or peat coke. As hard pitches, there may be used pitches or bituminous substances which have a softening point of at least 100° C., preferably a softening point in the range of from 120 to 160° C., as, for example, the corresponding coal tar pitches, petroleum pitches of gilsonites. Then, both components together are ground finely.

The mixing ratio of coke to hard pitch may vary within the ratios of 4:1 to 1:4. For preparing carbon bodies which are to be densified by after-pressing, a mixing ratio of coke to hard pitch between 1:1.5 and 1:4 is advantageously used.

The mixture of coke and hard pitch thus prepared is then passed through a mesh screen having a mesh width of at most 150μ. In order to obtain pores that have as small radii as possible (about 1μ), grinding is continued until the mixture passes through a mesh screen having a mesh width of 60μ. In each case, however, the screening residue should not exceed 3%.

The common grinding of carbon and hard pitch avoids the difficulties which arise when hard pitch is finely ground alone; at the same time it provides good mixing of both components. The mixture thus obtained shows a broad, continuous grain spectrum. This assures a substantially higher solidity, in particular a higher resistance to abrasion, in contradistinction to the unisized grain mixtures which are used for the preparation of artificial carbons.

The mixture of hard pitch and coke powder is then intimately mixed with a dispersion of colloidal graphite in water. The graphite dispersion may contain, in addition to water, also organic compounds which are miscible with water, but which in the presence of water do not cause dissolution or swelling of the pitch in the mixture; correspondingly, the graphite dispersion may be combined with, for example, low molecular weight aliphatic alcohols such as methanol or ethanol or acetone. The graphite dispersion is suitably added in such a quantity that the carbon-hard pitch mixture contains 2 to 10% of colloidal graphite, preferably 3 to 6% of graphite.

It should be noted that the magnitude of the volume of the liquid in the mixture influences the pore volume of the body after pressing. The quantity of liquid introduced with the dispersion of colloidal graphite into the mixture must be smaller than the volume of the interstitial space between the solid components and is in general in the range of between 10 and 30 ml., preferably in the range of between 12 and 25 ml., referred to 100 g. of total mixture.

The mixture thus obtained has the consistency of a moderately wet powder which can be easily shaped.

The mixture is then shaped by means of a press, preferably a block press. The pressing pressure must in each case be only so high that no liquid is squeezed out from the body pressed. Therefore, pressing pressures in the range of from 20 to 300 kg./cm.², preferably 50 to 150 kg./cm.², are applied. The pressure to be applied should be increased with increasing size of the body.

The pressed bodies thus obtained have a compactness which is sufficient for subsequent handling. Their internal bonding strength is essentially based on adhesional forces, whereas the hard pitch used as the binder is present at first in the form of a solid and becomes active as binder during baking of the body in the annular kiln.

After pressing, the bodies are dried at an elevated temperature, preferably at a temperature in the range of from 60 to 110° C. It is advantageous first to predry them under ordinary pressure and then to afterdry them, preferably under reduced pressure.

The dried bodies are then either baked to form porous carbon bodies and, if desired or required, impregnated or they are densified by after-pressing at an elevated temperature, preferably at a temperature in the range of from 30 to 50° C., below the softening point of the hard pitch used, and subsequently baked to form dense carbon bodies.

In order to obtain porous carbon bodies, the dried pressed bodies are baked as usual in the annular kiln, for example, with a temperature increase of 1 to 3° per hour and a final temperature of about 1000° C., for a baking period of 2 to 4 weeks. The carbon bodies thus obtained can be graphitized in known manner. Example 1 given hereinafter illustrates the preparation of such porous bodies.

In order to obtain dense carbon bodies, the completely dry pressed bodies are placed against in a pressing form adapted to their cross-section and pressed therein at an elevated temperature, which, however, is below the softening point of the hard pitch, with a high pressing pressure, suitably with a pressure in the range of from 200 to 1500 kg./cm.² By this pressing a "cold flowing" of the pitch component is caused which considerably reduces the pore volume to about ⅓–½ of its original value, depending on the pressure and temperature applied in the after-pressing. The bodies are then baked as usual in the annular kiln.

Further, it is possible to prepare dense carbon bodies by impregnating with pitches or synthetic resins the porous bodies which have been baked in the annular kiln; the impregnating agents are then coked by a renewed baking in the annular kiln.

Example 2 given hereinafter illustrates the prepartion of dense carbon bodies by after-pressing, while Example 3 describes the preparation of dense carbon bodies by impregnation.

The porous carbon bodies prepared according to the process of the invention which in addition to a high resistance to abrasion exhibit a particularly narrow band of pore size and a total pore volume of 30 to 65%, may be used, for example, for the preparation of chemical-resistant selective filters or of electrodes for fuel cells. Then dense carbon bodies prepared according to the process of the present invention are particularly suitable for the preparation of materials with fine structure for the production of chemical apparatus.

It is surprising that the porous carbon bodies prepared according to the process of the present invention take up a particularly great quantity of impregnating agent, and that they also retain it during baking, which is almost equal to the theoretcal quantity; therefore, the system of pores remains, despite its high fineness, completely filled with impregnating agent until coking.

In addition, it must be considered advantageous and surprising that after the impregnation of the carbon bodies obtained by the process of the present invention much higher coke yields are obtained from the impregnating agent on baking than on the making of known impregnated carbon bodies. Whereas the yield of coke from the impregnating pitch in known bodies amount to about 30–35%, a yield of coke of 60–65% is obtained with the finely porous carbon bodies of the present invention. Accordingly, the increases of the weight per unit volume on impregnation and baking are surprisingly high. Starting from a carbon body of the present invention having a weight per unit volume of, for example, 1.20, a single impregnation with following coking increases the weight per unit volume to about 1.5. In contradistinction thereto, with known bodies obtained from an extruder and having and initial weight per unit volume of 1.5, it is only possible to attain an increase to about 1.6 with the same impregnating treatment. By a second impregnation, the weight per unit volume of the bodies of the present invention can be increased from 1.5 to 1.7, whereas that of known bodies can be increased from 1.6 to 1.66 only. Hence, by several times repeating the impregnation and baking of the bodies of the present invention it is possible to produce from the originally strongly porous bodies, bodies that have weights per unit volume which are considerably higher than those obtained with correspondingly treated known bodies. Similar favorable results are also obtained by impregnating the bodies densified by after-pressing. The bodies so obtained are distinguished from those prepared according to known methods by their very sharp maximum of the pores' diameter which, surprisingly, remains constant also after impregnation and is only slightly shifted to the region of smaller pore diameters.

Another advantage of the carbon bodies prepared according to the process of the present invention over the known bodies is, on the one hand, the fineness of the pores, and, on the other hand, their uniform size which can be regulated at will to a narrow pore distribution maximum between $1\mu$ and $10\mu$. Small pore diameters are obtained by a large proportion of coke, high grinding fineness, low water content and high pressing pressure. By reversing the mixing ratios or the technical conditions, bodies with larger pores are obtained.

The following examples illustrate the invention but they are not intended to limit it thereto, the parts being by weight.

EXAMPLE 1

100 parts of calcined petroleum coke powder having a particle size of at most 0.09 mm. were mixed with 50 parts of a hard pitch having a softening point of 150° C. and preground to at most 0.2 mm. This mixture was ground in a pinned mill until a maximum screening residue of 3% remained on passage through a mesh screen having a mesh width of $90\mu$. 90 parts of the finely ground coke-pitch mixture thus obtained were mixed with 30 parts of a 30% dispersion of colloidal graphite in water. After thorough homogenization (mixing time 1–2 hours), the mixture was cold pressed in a block press at room temperature, the specific pressure being in the range of from 20 to 50 kg./cm.². The green bodies thus obtained were then dried for 12–14 hours at a temperature of up to 105° C. in a drying cabinet and then subjected to slow baking for 20 days in the annular kiln with an average temperature gradient of 2.5° C. per hour, at a temperature of between 300 and 600° C., and a final temperature of 1000° C. In this manner, carbon bodies were obtained which were resistant to abrasion and had solid edges and had suffered a linear baking loss of about 3% during baking. The bodies had a weight per unit volume of 1.0 to 1.3 g./cm.³, depending on their absolute size (corresponding to an accessible pore volume of about 30 to 55%). They had a distinct pore diameter maximum between 1.5 and $2.5\mu$.

EXAMPLE 2

65 parts of precomminuted hard pitch having a softening point of about 150° C. were ground together with 35 parts of petroleum coke filter dust until 98% of this grinding mass passed through a mesh screen having a mesh width of $90\mu$. 90 parts of the coke-pitch mixture thus obtained were mixed with 30 parts of a 30% dispersion of colloidal graphite in water. After homogenization, the mixture was shaped, at room temperature, on a block press with a pressure of about 50 kg./cm.². The green body so obtained was then dried for 6 hours at 90° C. and then for 12 hours, in a vacuum, at 70° C./20 mm. Hg. The dried body was then densified in a suitable pressing form by after-pressing in a block press with a pressure of 800 kg./cm.² at a temperature of 100° C. This was followed by baking in the annular kiln under the conditions mentioned in Example 1. In this manner a carbon body was obtained that had a weight per unit volume of 1.5 g./cm.³. The pore system of the body was of such a fine structure that its gas permeability amounted to $10^{-3}$ cm.²/sec.

EXAMPLE 3

A finely porous baked carbon body prepared as described in Example 1 was impregnated at a temperature of 180° C. with coal tar pitch having a softening point of 50–60° C. by evacuation to a pressure of 100 mm. Hg and subsequent subjection to a pressure of 8 atmospheres for 2 hours. The impregnated body was then baked as described in Example 1 in the annular kiln. Carbon bodies were obtained which had weights per unit volume of between 1.4 and 1.55 g./cm.³, depending on the initial weight per uint volume which was between 1.0 and 1.3 g./cm.³.

When the bodies were again subjected to an impregnation and subsequent baking in the annular kiln, they showed weights of unit volume in the range of 1.65 and 1.75 g./cm.³.

The volume of the accessible pores in the carbon body was thereby reduced to about 10 to 18%.

We claim:

1. A process for preparing finely porous, shaped carbon bodies, said process comprising the steps of:
    (a) separately grinding coke and hard pitch to a particle size of at most 1 mm., said pitch having a softening point of at least 100° C.,
    (b) mixing the ground coke and pitch into a ratio of from 4:1 to 1:4,
    (c) further grinding the mixture of coke and pitch until the ground mixture passes substantially through a mesh screen having a mesh width of at most 150μ, the residue of the screening not exceeding 3%,
    (d) mixing the ground mixture of coke and pitch with a dispersion of colloidal graphite, the amount of liquid contained in the colloidal graphite mixture being smaller than the volume of the interstitial space between the solid components,
    (e) shaping the mixture of coke, pitch, and dispersed graphite in a press, at a pressure in the range of from 20 to 300 kg./cm. such that no liquid is squeezed out from the pressed body,
    (f) drying the pressed body, and
    (g) baking the body to form a porous, shaped carbon body.

2. A process as claimed in claim 1, wherein the hard pitch has a softening point between 120° and 160° C.

3. A process as claimed in claim 1, wherein the quantity of liquid contained in the graphite dispersion ranges from 10 to 30% of the mixture.

4. A process as claimed in claim 1, wherein optional grinding is carried out after step (c), the grinding is continued until the mixture will pass through a mesh screen having a mesh width of 60μ.

5. A process as claimed in claim 1, wherein the mixture contains 2 to 10% of colloidal graphite.

6. A process as claimed in claim 1, wherein the shaped body is dried and subjected to a pressure exceeding 200 kg./cm.² and to an elevated temperature not exceeding the softening temperature of the hard pitch used, and subsequently baked to form a dense carbon body.

7. A process as claimed in claim 6, wherein the elevated temperature not exceeding the softening temperature of the hard pitch is about 30 to 50° C. lower than the softening point of the pitch.

8. A process as claimed in claim 1, wherein a low molecular weight aliphatic alcohol or acetone is added to the mixture.

References Cited

UNITED STATES PATENTS 1,307,738  6/1919  Hinckley.
2,087,724  7/1937  Sanders _____ 264—29 X ROBERT F. WHITE, *Primary Examiner.*

J. H. SILBAUGH, *Assistant Examiner.*

U.S. Cl. X.R.

23—209.1; 106—38.8, 284